Oct. 1, 1968 J. H. COCQUART 3,404,389

MATRIX MEMORY ASSEMBLY

Filed April 8, 1965 2 Sheets-Sheet 1

INVENTOR

Jean Henri Cocquart

BY

Baldwin & Wight

ATTORNEYS

Oct. 1, 1968 J. H. COCQUART 3,404,389

MATRIX MEMORY ASSEMBLY

Filed April 8, 1965 2 Sheets-Sheet 2

INVENTOR
Jean Henri Cocquart
BY
Baldwin & Wight
ATTORNEYS

United States Patent Office 3,404,389
Patented Oct. 1, 1968

3,404,389

MATRIX MEMORY ASSEMBLY

Jean Henri Cocquart, Boulogne-Billancourt, France, assignor to Societe Industrielle Bull-General Electric (Societe Anonyme), Paris, France Filed Apr. 8, 1965, Ser. No. 446,524
Claims priority, application France, Apr. 24, 1964, 972,150
6 Claims. (Cl. 340—174)

The present invention relates to improvements in a permanent storage apparatus described in Patent Application Ser. No. 287,442, filed June 12, 1963 now patent number 3,319,234. These improvements concern the method of production and constructional details which render possible an economic manufacture free from the uncertainties of apparatus of this type.

As described in the aforementioned patent application, the storage device may also be regarded as an encoding device. When such a device is designed to store a number N of information words, each of which may comprise a number $n$ of binary positions, it is composed of $n$ transformer elements associated with N "word" windings. Each transformer element consists of a rectilinear elongated ferrite core supporting a secondary winding. Each word winding is made of an insulated conductive wire forming a primary turn coupled to the transformer element of each storage position in which a binary value, for example 1, must be stored for the word under consideration at the time of the design. When a word winding is selectively energised by a current variation in the course of its use, the secondary windings simultaneously supply a pulse at each binary position containing a 1 in the selected word.

When used in a data processor, such a permanent storage device must generally be endowed with a relatively high storage capacity in regard either to the number of words or to the number of binary positions (or "bits"), or in regard to both.

The number of bits $n$ may vary between 20 and 72 and even more. While the word capacity required may be several hundred words, it is scarcely possible for practical reasons to incorporate more than 128 words in one storage element. However, it will be appreciated that the weaving of such a number of word windings is in itself a farily lengthy and delicate operation by reason of the dangers of errors in the course of the formation of the primary turns.

A first object of the invention is to provide a design of such a permanent storage element which can be reliably and economically produced. This object is achieved by virtue of the fact that the weaving of all the word windings of a storage element is carried out with an uninterrupted conductive wire and that the word windings are separated only after the respective end wires have been soldered to access conductors or terminals.

Another object of the invention is to provide a particular design of such a storage element which eliminates all manipulation of the conductive wire of the word windings in the course of the weaving of the latter by mechanised means.

Consequently, in accordance with the invention, in a permanent storage device comprising a number $n$ of elongated transformer elements disposed in parallel relationship in a first plane, a number N of word windings juxtaposed in a direction perpendicular to the aforesaid elements and each having single-turn couplings with some of the latter, there is proivded a circuit plate of insulating material which is disposed in a second plane distant from and parallel to the first plane, the said plate being provided with separate strips bearing on the face opposite to the transformer elements, flat access conductors, there being provided at least one strip with one conductor to which are soldered the homologous ends of the wires of at least one group of word windings, and a number of other strips equal to the number of word windings in this group, so that the other end of the word windings is soldered to the conductor of a different strip, and means for ensuring the positioning of the said transformer elements and the circuit plate.

Further features of the invention and its application will become more clearly apparent from the following description, which is given by way of example and with reference to the accompanying drawings, in which:

FIGURES 1*a* and 1*b* are symbolic diagrams of a permanent storage device and of a transformer element as described in the aforementioned Patent Application;

Figures 1A, 1B, 2, 3:
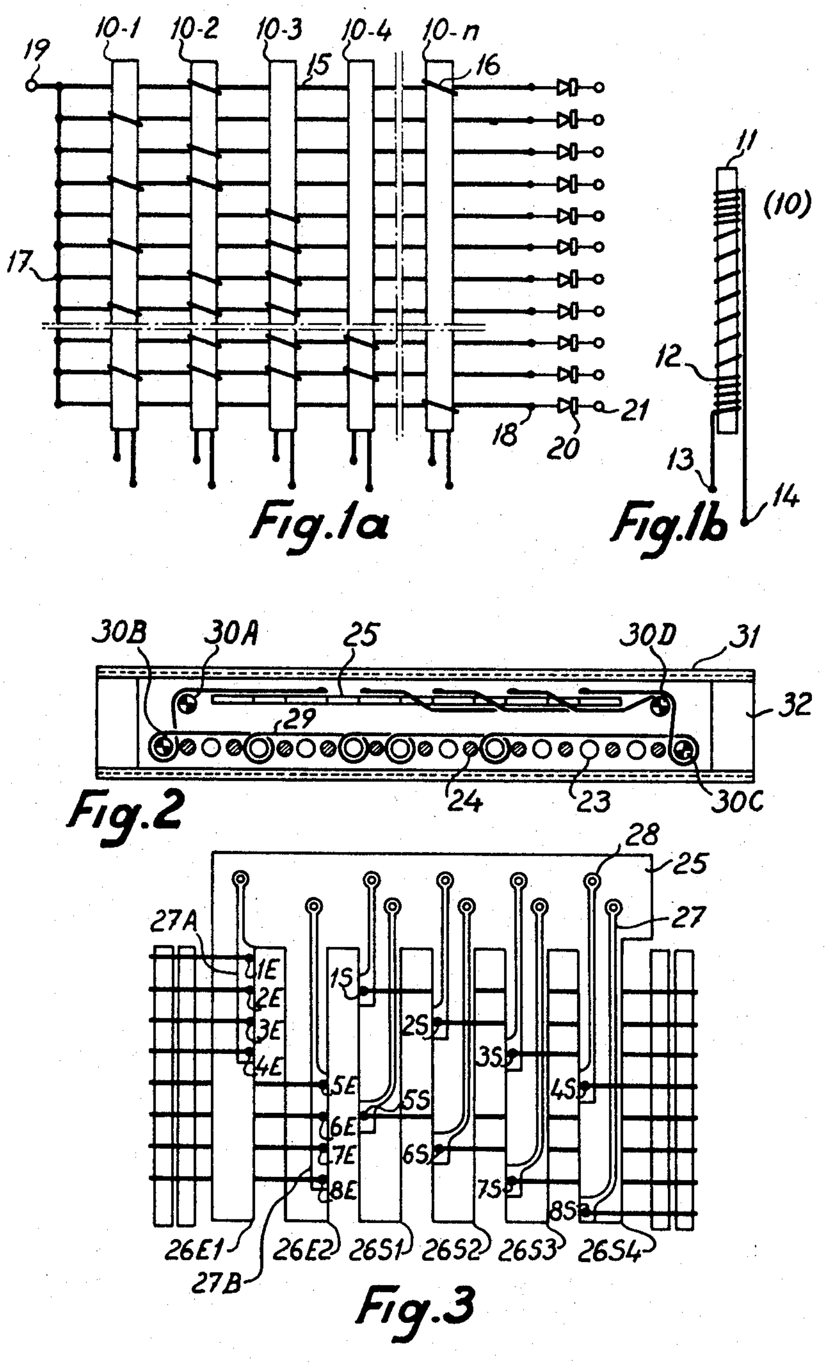
FIGURES 2 and 3 are, respectively, a front view and a fragmentary plan view of a storage element according to the invention.

In FIGURE 1*a*, the storage device is composed of a number of transformer elements 10—1 to **10—*n*, this number being equal to the maximum number $n$ of bits composing a word. A transformer element 10**, as illustrated in FIGURE 1*b*, consists of a core 11 of high-frequency ferrite having the form of a cylinder. The latter may have, for example, a diameter of 2.5 mm. and a length of 40 mm. A secondary winding 12 wound and secured on the core comprises two end wires 13, 14, which must be separately accessible after completion of the storage device.

In FIGURE 1*a*, each of the word windings, such as 15, is shown in the form of a horizontal conductor. To correspond to each group of characters, or each word, stored in the production of the device, a word winding comprises single-turn coils such as 16, which are wound about some of the transformer elements 10, that is to say, on those of the binary positions in which the binary 1, for example, is to be stored.

For the sake of clarity in the following, it will be conventionally assumed that the ends such as 17 to the left of the word windings are the "input" ends for the current, and the consequently the right-hand ends, such as 18, are the "output" ends for the current. All the ends 17 may be connected to a common terminal 19. The extraction of a stored word is effected by separate energisation of the corresponding word winding, the selection generally being effected by means of electronic switches, which are usually composed of transistors. It is therefore desirable to provide a unidirectionally conducting member in the connection. A crystal diode 20 is therefore connected between one end 18 of each word winding and one output terminal such as 21.

Only reduced numbers of transformer elements and word windings have been illustrated, in order to simplify the drawing. On the other hand, since each word winding consists of an insulated wire of small diameter, the word windings are in practice disposed very close together. It follows that it is possible to dispose 128 word windings in a storage element utilizing the transformer elements indicated in the foregoing.

The production of a permanent storage device of the above-defined type gives rise to the problem of access to such a large number of word windings, as also to the problems of minimum space requirement, low cost of production and elimination of errors of all kinds.

Figure 4:
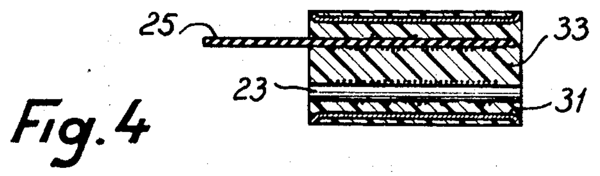
FIGURE 4 is a cross-sectional view of the said element.

This particularly advantageous construction will be explained with reference to FIGURES 2, 3 and 4. Before this is done, the known principles of economic selection must be recalled, which consists, in the case of a plurality of matrix conductors, in effecting the selection from the two sides in order to minimize the number of necessary switches. If the "input" ends of N conductors are multipled in $p$ input groups, $p$ input switches will be required. If the "output" ends of these conductors are multipled in $q$ output groups, $q$ output switches will also be required. It is known that the total number of switches is minimum in the case where $p=q=\sqrt{N}$. Now, not only is N not necessarily in exact power of 2, but other reasons may make it necessary to adopt a different distribution without excessively increasing the number of switches.

For example, in a practical construction with $N=128$, there may be chosen $p=8$ and $q=16$. The permanent storage element illustrated in FIGURES 2, 3 and 4 has been shown as having a much more limited capacity, in order greatly to simplify the drawing, while enabling the principles of the design to be explained. In the case of the figures of the drawings, the storage element comprises 10 transformer elements and 8 word windings distributed in 2 groups of 4 each. There may be seen in FIGURE 2 blank circles 23 marking the locations of the transformer cores 10. The hatched circles, such as 24, represent shielding cores, such a shielding core being disposed between two consecutive transformer elements and on either side of the extreme transformer elements.

The transformer elements are shown as being disposed in a plane, in the present instance horizontal. The circuit plate 25 is disposed parallel to and at some distance from the plane of the transformer elements. The said plate (FIGURE 3) comprises a solid portion and a number of strips 26E1 to 26S4 separated by notches. Flat conductors 27 are secured to the circuit plate by any method for the production of printed circuits. Each conductor has a connecting stud 28 for connection to an external component. Two conductors 27 are provided on each of the strips 26S1 to 26S4. For example, on the strip 26S4, the rectangular widened portions of the printed conductors serve for the soldering of the output ends 4S and 8S. Each word winding (such as 29, FIGURE 2), comprises an active portion in the sense that coupling turns are made with some of the transformers 23. The ends of the wire constituting each word winding are bent over to form an open loop. The wires are wound, at the ends of the storage element, on pins 30A to 30D, which are not left in the final circuit arrangement, as will hereinafter be explained.

The storage element comprises a metal frame composed of two brass cheeks 31 connected by two blocks 32, also of brass. All the previously indicated parts are connected by a hardenable bonding agent, shown at 33 (FIGURE 4), which is cast in the metal frame.

Figure 5:
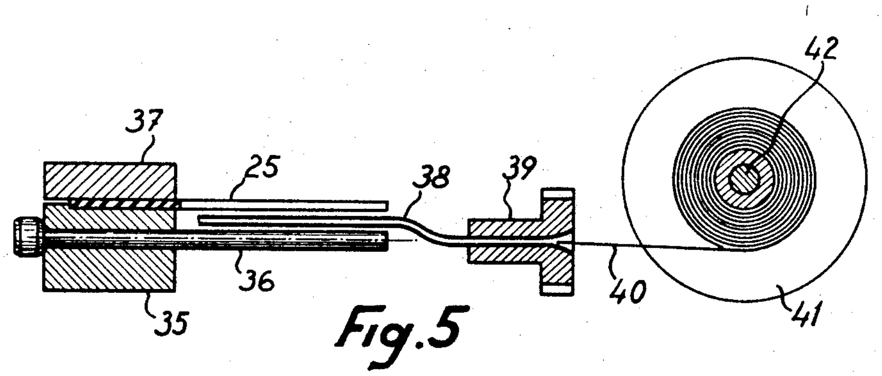
FIGURE 5 illustrates an example of equipment for explaining the process of production.

Examination of the preferred process of production will enable the last details of the construction to be more readily understood. The transformer elements 10 are separately produced, as also is the circuit plate 25. The weaving of the word windings, which is a fairly lengthy and delicate operation, is carried out with the aid of equipment illustrated in FIGURE 5. Of this equipment, only the essential parts are shown, but these will be sufficient to enable its principle to be understood. A block 35 is formed with holes to receive the cylindrical pins 36. There are as many pins 36 as there are transformer elements, plus four end pins as shown at 30A to 30D in FIGURE 2, and in the same positions. The pins 36 extend beyond the block 35 to a distance equal to the length of the transformer cores.

The circuit plate 25 bearing its printed circuits is positioned and gripped between the block 35 and the gripping plate 37 by any appropriate means. The weaving of the word windings is effected by means of a hollow needle 38, part of which is offset so as to be able to turn around a pin 36, the axis of rotation of the needle coinciding with the axis of a pin 36. There is shown at 39 a member coupled to the needle 38 and intended to rotate it. The wire 40 intended to form the word windings is supplied from a reel 41 rotatable about a shaft 42. Means not shown must be provided to move the needle and the reel longitudinally in the plane of the axes of the pins, to stop the needle and reel opposite the desired pins and to shift them vertically when necessary.

The wire 40 is a copper wire insulated with an enamel which melts at the soldering temperature. This wire, which is called "thermo-weldable," may have an external diameter of 0.11 mm. and is therefore very flexible.

When the wire has been threaded into and out of the needle 38, the weaving is proceeded with in the following manner. The end of the wire is first held fast so as to form the beginning of the word windings, for example, by the solder blob 1E (FIGURE 3) on the strip 26E1. The needle is then in the raised position, that is to say, its orifice through which the wire leaves it is above the circuit plate 25. The needle is shifted to the left of the drawing until it is immediately vertically above the pin 30B. The needle is thereafter lowered in order that its axis of rotation may coincide with the plane of the axes of the lower pins. The needle performs one revolution in the clockwise direction, so that the wire is stretched on the pin 30A and a wire loop is formed around the pin 30B. The needle is then shifted to the right as far as the axis of the pin on to which the first primary turn of the first word winding is to be wound. This turn is formed by one revolution of the needle and, after the appropriate displacements to the right, this operation is repeated at all the succeeding positions in which primary turns are to be formed. When the last of these turns has been formed, a further displacement to the right brings the needle on to the axis of the pin 30C. One revolution of the needle provides a terminal loop on the pin 30C. The needle is shifted upwards and at the same time it is offset by one step so that the end of the needle is removed from the block 35. The length of this step is in practice 0.25 mm., which is suitable for the thickness of one turn. The needle is thereafter shifted to the left and then towards the lower level, so that the wire passes between the pin 30D and the strip 26S4 (FIGURES 2 and 3). The needle is thereafter shifted to the left. The end "output" wires must pass under the circuit strips, and over the strip intended for the soldering of the corresponding winding end.

In the present case, the needle is stopped and shifted upwards in order that the wire may pass into the notch between the strips 26S1 and 26S2. The needle is thereafter shifted to the left until it is in vertical alignment with the pin 30B. Thus, the wire is not interrupted between the output end 1S of the first word winding and the input end 2E of the second word winding. The weaving is continued in the manner indicated for all the succeeding word windings, without the wire ever being interrupted and without any direct manipulation of the wire by the operator. The weaving is complete when the "output" end 8S of the last word winding is brought above the strip 26S4. Since it is assumed that there are two groups of four "input" end wires, there are two strips 26E1 and 26E2, each for the soldering of four "input" end wires, because it is obvious that, since the soldering areas 27A and 27B must each be as long as the space necessary for the soldering of the wires, they cannot be disposed on a common strip without losing much space. It is to be noted that in FIGURE 3 the wires have been shown with a greatly exaggerated spacing in order to facilitate the positioning of the reference numerals 1E–8E and 1S–8S. It will be recalled that in practice the spacing between adjacent wires is 0.25 mm. It will also be appreciated that this type of design would be of no use for a storage capacity as small as that illustrated in FIGURES 2 and 3.

The next operation consists in the tin soldering of the ends of the word windings on the soldering areas of the printed conductors on the strips as illustrated in FIGURE 3. The unnecessary wire sections are thereafter cut, for example between the ends 1S and 2E, 2S and 3E, and so on. For this purpose, a cutting instrument is employed, which is guided along the appropriate edges of the strips. All the unnecessary wire sections are thereafter withdrawn.

A mould is thereafter formed by adding external blocks to the block 35–37. The metal frame 31, 32 is introduced into the mould, as also are the shielding cores 24, which are disposed in the positions indicated in FIGURE 2. As hardenable bonding agent, there may be employed an epoxy resin, one type of which is known under the name "Araldite." The latter is poured into the mould and, after polymerisation, a rigid assembly is obtained. The mould release is effected, in the course of which the pins 36 and 30A to 30D are withdrawn one by one from the word windings, which are rigidly held in and by the resin. The pins, which may have a diameter of 3.2 to 3.5 mm., are preferably coated with a siliconised varnish in order to prevent sticking of the resin to the pins.

It merely remains to introduce the transformer elements into the seatings afforded by the locations of the assembly pins. However, the locations of the end pins remain empty in the positions 30A to 30D of FIGURE 2. The ends of the transformer elements, which are flush with at least one outer face of the resin block, may be simply secured by a little gum or wax.

It is to be noted that the pitch and the spacing of the circuit strips need not be related to the longitudinal spacing of the transformer cores 23, which is the case in the representation adopted in FIGURES 2 and 3.

Figure 6:
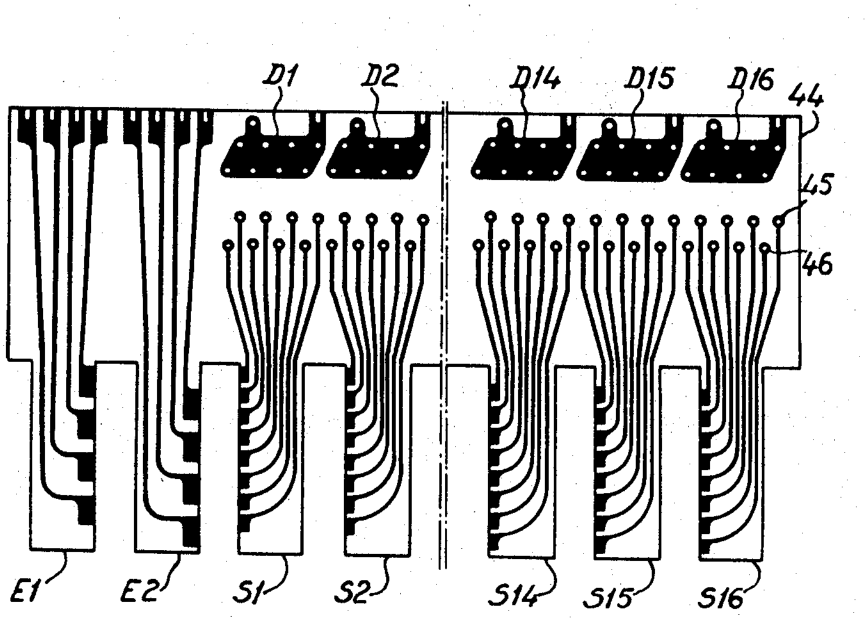
FIGURE 6 is a view of a circuit plate designed for connecting 128 word windings.

On the other hand, if desired, the strips of the circuit plates may be dimensioned in direct relationship with the length of the spacing between the transformer cores. This principle is applied to the circuit plate illustrated in FIGURE 6. This plate is designed for the connection of 128 word windings. In these word windings, the "input" ends are distributed in a number ($p=8$) of groups of $q=16$ wires each, and the "output" ends are distributed in a number ($q=16$) of groups of ($p=8$) wires. The circuit plate 44 may consist of a sheet of glass fabric impregnated with epoxy resin, for example of a thickness of 1.6 mm. It comprises 18 strips, of which two E1 and E2 support the printed circuit conductors for the soldering of the eight groups of "input" wires, and of which the others S1 to S16 support the conductors for the soldering of the 128 "output" wires. The latter conductors are terminated by soldering lugs such as 45 and 46 disposed at different levels, but each centred on a hole in the plate 44. The latter also supports 16 soldering studs D1 to D16. Each of these studs is formed with eight holes situated at equal distances from the corresponding holes in the lugs such as 45 and 46. The wires for the connection of a crystal diode may be introduced into each pair of vertically aligned holes for the purpose of soldering.

In the present case, the spacing pitch 1 of the transformer elements is 6.6 mm. The spacing of the strips E1, E2, S1 to S16, i.e. the distance between the left-hand edges of two adjacent strips, is equal to 3 times the pitch 1. It follows that the centre of each strip must be situated above the axis of a transformer element. This has the advantage that the positions in which the weaving needle is stopped may be unified, i.e., that these positions may always coincide with the axis of a pin, not only in the displacements to the right or to the left, but also when the needle is obliquely displaced in order to be brought into a notch between two adjacent strips.

It will be appreciated that an important advantage of the construction just described is that the weaving of the word windings may be performed on a fairly extensively automated machine. For example, the displacements and rotations of the weaving needle may take place under the control of a pre-set programme, whereby the winding errors which may result from human failure may be obviated.

I claim:

1. In a matrix arrangement for the storage of binary words, composed of a number $n$ of transformer elements, $n$ being equal to the number of binary position, each element consisting of an elongate prismatic core on which a secondary winding is wound, all the transformer elements being spaced apart in parallel relationship in a plane, and a number N of word windings for storing N words, each of the said word windings consisting of a single conductive wire extending perpendicularly to the said transformer elements and comprising coupling turns, one turn forming a primary coil about a transformer element, only in the binary positions in which a significant bit is stored, all the said word windings being disposed in parallel relationship along the length of the transformer elements, the improvement consisting in a circuit plate of thin insulating material disposed at a distance from and in parallel relationship to the said plane, the said plate comprising a plurality of strips which are separated by notches and which overhang the said word windings, soldering surfaces being secured to the said strips on the face opposite to the said transformer elements, there being provided at least one strip with a surface for the soldering of first ends of the wires of a group of the said word windings, and at least a number $q$ of other strips, each with a surface for soldering a second end of a wire of a different word winding when the said group comprises $q$ word windings, and securing means for positioning the said transformer elements and the said circuit plate.

2. A matrix arrangement according to claim 1, wherein the said securing means comprise a metal frame which surrounds the said transformer elements and the said circuit plate, as also a hardened medium such as a thermosetting resin cast between the said metal frame and the parts to be secured.

3. A matrix arrangement according to claim 2, wherein each of the said second ends generally extends between the said transformer elements and the said strips, except when this end passes over the external face of the strip to which the said end is soldered.

4. A matrix arrangement for the permanent storage of binary words, comprising a number $n$ of transformer elements, $n$ being equal to the number of binary positions, each element consisting of an elongate cylindrical core on which there is wound a secondary winding, all the transformer elements being spaced in parallel relationship in a common plane, and a number N of word windings for storing N words distributed in $p$ groups of $q$ words each, each word winding consisting of a single conductive wire extending perpendicularly to the said transformer elements and comprising single coupling turns forming a primary coil about some of the said transformer elements, all the word windings being disposed in parallel relationship along the length of the said transformer elements, this arrangement comprising in addition a circuit plate of insulating material disposed at a distance from and parallel to the said plane, which plate comprises a plurality of separate strips which overhang the said word windings, the said strips supporting on the face opposite to the said transformer elements printed soldering surfaces, namely two strips supporting in combination a number $p$ of soldering surfaces, each surface being soldered to the $q$ first ends of the word windings of a different group, and a number $q$ of strips each supporting a number $p$ of surfaces, each of which is soldered to a second end of a different word winding, and securing means which rigidly secure the said transformer elements to the said circuit plate.

5. A matrix arrangement according to claim 4, wherein each of the said second ends generally extends between the plane of the said transformer elements and the said strips, except when this end passes over the external side of the strip to which the said end is soldered.

6. A matrix arrangement according to claim 5, wherein the said securing means comprise a metal frame which surrounds the said word windings and the said circuit plate, as also a hardened medium such as a thermosetting resin cast in the said metal frame to embed the said word windings.

References Cited

UNITED STATES PATENTS

| | | | |
|---|---|---|---|
| 3,142,889 | 8/1964 | Austen. | |
| 3,143,731 | 8/1964 | Bossard. | |
| 3,175,200 | 3/1965 | Hoffman et al. | 340—174 |
| 3,160,864 | 12/1964 | Snyder | 340—174 |
| 3,290,512 | 12/1966 | Tillman et al. | 307—88 |
| 3,319,234 | 5/1967 | Brette | 340—174 |
| 3,339,184 | 8/1967 | Pick | 340—174 |

STANLEY M. URYNOWICZ, JR., *Primary Examiner.*